United States Patent Office 2,785,968
Patented Mar. 19, 1957

2,785,968

HERBICIDAL ESTERS OF 2-SULFOETHANOL AND A CHLOROALKANOIC ACID

Milton Kosmin, Dayton, Ohio, assignor to Monsanto Chemical Company, St. Louis, Mo., a corporation of Delaware No Drawing. Application May 9, 1955, Serial No. 507,175

9 Claims. (Cl. 71—2.7)

This invention relates to the sulfo esters of halogenated acids, to herbicidal compositions containing the new esters, and to methods of treating vegetation therewith.

The new esters provided by the invention may be represented by the formula

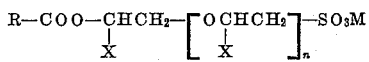

where R is a monovalent chain of from 1 to 3 carbon atoms, at least one of which carries at least one halogen substituent, X is selected from the class consisting of hydrogen and the methyl radical, $n$ is a number of from 0 to 14, and M is a water-solubilizing cation.

The present esters may be readily prepared by the reaction of a hydroxyalkanesulfonic acid, hydroxyalkoxy-alkanesulfonic acid or water-soluble salt thereof, with the appropriate halogenated carboxylic acid or acyl halide, substantially according to the scheme:

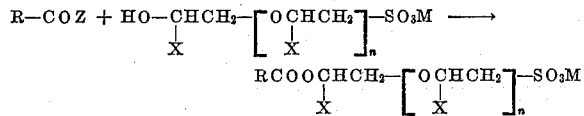

where Z is a halogen atom or hydroxy radical, and R, X, $n$ and M are as hereinabove defined.

As examples of suitable halogenated acids for preparing the compounds of the invention may be mentioned, e. g., the saturated halogenated carboxylic acids of from 2 to 4 carbon atoms, such as chloroalkanoic acids, e. g., chloroacetic acid
dichloroacetic acid
trichloroacetic acid
α-chloropropionic acid
α,β-dichloropropionic acid
α,α-dichloropropionic acid
α,β,β-trichloropropionic acid
α-chlorobutyric acid
α,β,γ-trichlorobutyric acid
γ,γ,γ-trichlorobutyric acid, etc.

Another class of halogenated acids of from 2 to 4 carbon atoms suitable for use in preparing the esters of the invention are the bromo-, iodo- and bromoiodo-alkanoic acids, e. g., bromoacetic acid, α-bromo-β-iodo-propionic acid, α,α-dibromopropionic acid, β,γ-dibromo-γ-iodobutyric acid, etc. Another class of halogenated alkanoic acids useful in preparing the present esters are the alkanoic acids bearing chlorine substituents together with other halogen substituents, i. e., α-chloro-α-iodo-propionic acid, β-bromo-α,α-dichloropropionic acid, chlorobromoacetic acid, γ,γ,γ-trichloro-α-iodobutyric acid, etc.

Still another class of halogenated acids useful in preparing the present esters are the halogenated derivatives of unsaturated, olefinic acids of from 2 to 4 carbon atoms. This class includes, e. g., chlorinated derivatives such as α-chloroacrylic acid, α,β,β-trichloroacrylic acid, β-chloro-α-methylacrylic acid, β,β-dichloro-α-methylacrylic acid, α-chlorocrotonic acid, γ,γ-dichloro-isocrotonic acid, 2-chloro-3-butenoic acid, etc.

It is to be understood that for any of the above halo-alkanoic or haloalkenoic acids may be substituted the corresponding acid chloride, e. g., chloroacetyl bromide, α,α-dichloropropionyl chloride, β,β,β-trichloroacrylyl chloride, etc.

The hydroxylated sulfonic compounds which may be used in preparing the present esters include isethionic acid, 2-methylisethionic acid, the hydroxy ethers of these acids, and the water-soluble salts of such hydroxy sulfonic acid compounds. The water-soluble salts of these sulfonic acids are particularly preferred for use in the present invention. These include, e. g., alkali metal salts such as sodium isethionate, ammonium salts such as ammonium 2-methylisethionate, and organic amine salts such as the butylamine or the ethanolamine salts of isethionic acid. The hydroxy ethers of isethionic and 2-methylisethionic acids may be prepared by reaction of said acid compounds with ethylene oxide, isopropylene oxide, or with ethylene or polyalkylene glycols. Examples of water-soluble salts of such hydroxy ethers are sodium 2-(2-hydroxyethoxy)ethanesulfonic acid, the ammonium salt of the tetraethylene glycol ether of isethionic acid, the isopropanolamine salt of the condensation product of 1 mole of 2-methylisethionic acid and 10 moles of isopropylene oxide, etc.

By the condensation of isethionic or 2-methylisethionic acid or water-soluble salts thereof with haloalkanoic acids of from 2 to 4 carbon atoms, 2-sulfoethyl and 2-sulfopropyl esters of these acids are prepared. These include esters of haloalkanoic acids such as:

2-(sodium sulfo)ethyl trichloroacetate
2-sulfopropyl α,α-dichloropropionate
2-(ammonium sulfo)ethyl α-bromo-β-iodopropionate
2-(potassium sulfo)ethyl dibromoacetate
Dipropylamine salt of 2-sulfoethyl γ,γ,γ-trichlorobutyrate
Diethylenetriamine salt of 2-sulfopropyl α,α-dibromopropionate
Ethanolamine salt of 2-sulfoethyl α,α-dichloropropionate, etc.

Also included among sulfo esters which may be prepared in this manner are the 2-sulfoethyl and 2-sulfopropyl esters of haloalkenoic acids, e. g., 2-(sodium sulfo)ethyl α-chloroacrylate
2-(ammonium sulfo)propyl α,β,β-trichloroacrylate
2-(sodium sulfo)ethyl α-bromocrotonate
2-(lithium sulfo)ethyl 2-iodo-3-butenoate
Triethylamine salt of 2-sulfoethyl α,β,β-trichloroacrylate
Morpholine salt of 2-sulfopropyl β-chloro-α-methylacrylate
Isopropanolamine salt of 2-sulfoethyl γ-chloro-α-iodoisocrotonate, etc.

Still another class of sulfo esters are those prepared by reaction of a haloalkanoic or haloalkenoic acid with a hydroxy ether of isethionic or 2-methylisethionic acid, e. g., The sodium salt of the ester of α,α-dichloropropionic acid and the diethylene glycol ether of isethionic acid
The morpholine salt of the ester of chloroacetic acid and the pentaethylene glycol ether of 2-methylisethionic acid
2-(2-sodium sulfoethoxy)ethyl trichloroacetate
2-(2-ammonium sulfopropoxy)ethyl β-chloro-α-methylacrylate, etc.

In preparing the present esters, the hydroxylated sulfonic compound is simply contacted with the halogenated carboxylic acid compound until reaction is complete. The heat which need be applied depends on the reactants; in the reaction of a carboxylic acid halide with the hydroxy sulfonic acid or sulfonate salt, the exothermic heat of reaction may suffice to complete the reaction, or gentle heating, i. e., at around 50–60° C., may be applied if desired to drive the reaction rapidly to completion. When it is desired to react the free halogenated carboxylic acid with the hydroxy sulfonic acid compound, temperatures of from, say, 100° C. to below the decomposition point of the mixture may advantageously to applied. The reaction may be carried out at ordinary atmospheric, sub-atmospheric or super-atmospheric pressures. Generally, in order to permit smooth reaction at higher temperatures, i. e., above 200° C., diminished pressures, e. g., 10–100 mm. of mercury, may usefully be applied.

Since the reaction, as indicated by the equation given above, requires one mole of the hydroxy sulfonic acid compound and one mole of the halogenated carboxylic acid compound to produce one mole of the desired sulfo ester, generally equimolecular amounts of the said sulfonic and carboxylic acid compounds will be employed. Direct reaction of equimolecular amounts of the reactants and removal of the condensation products as they are evolved during the reaction may produce the desired ester directly, without the necessity of further treatment to remove extraneous material. In some circumstances, however, it may be advantageous to use an excess of one of the reactants, so as to drive the reaction of the other reactant toward completion; the unreacted component may be removed at the end of the reaction by distilling, extracting, washing, etc. Diluents may be employed if desired, i. e., to moderate the reaction, but are not usually necessary. A catalyst is not generally necessary, but may be used; catalysts promoting this reaction are organic or inorganic acidic or basic compounds, such as sulphuric acid, sodium hydroxide, toluenesulfonic acid, sodium methoxide, etc.

As mentioned above, the hydroxy sulfonic compound employed in the reaction may be either the free acid or a water-soluble sulfonate salt. If the former is used in the reaction, it will be apparent to those skilled in the art that the ester obtained will contain a free sulfonic acid group. We have found that it is generally advisable, for ease in manipulation and storage, to convert the ester obtained by the reaction of a free hydroxy sulfonic acid and a halogenated carboxylic acid compound into a sulfonate salt. This may be done by neutralizing the acid sulfo ester with an organic or inorganic basically reacting agent until a neutral product is obtained. Useful basic materials in the neutralizing step are alkali metal or ammonium hydroxides or basically reacting salts thereof, water-solubilizing alkyl or alkanolamines, morpholine, etc.

The present sulfo esters and the salts thereof are generally stable, waxy to crystalline solid materials, which are characterized by high water-solubility and, in contrast to the hitherto-known esters of the corresponding carboxylic halogenated acids, have a surprising low volatility. The esters of the invention are useful for a variety of agricultural and industrial purposes; for example, they may be used as chemical intermediates and as biological toxicants, e. g., herbicides.

The invention is further illustrated, but not limited, by the following examples:

Example 1

To a flask equipped with stirrer, thermometer and condenser were charged 262.5 g. (2.78 moles) of chloroacetic acid and 325.6 g. (2.20 moles) of sodium isethionate. The mixture was heated at 165–215° C. over a period of almost 5 hours, during which time 53.5 g. of liquid were collected in the condenser trap. The flask contents were poured off and found to solidify at 185° C. This material was washed with acetone and filtered three times, and dried at 45° C. under vacuum. A portion of this product was dissolved in water and precipitated from the aqueous solution by addition of alcohol, giving a precipitate of 2-(sodium sulfo)ethyl chloracetate which analyzed as follows:

|  | Found | Calculated for $C_4H_6ClNaO_5S$ |
| --- | --- | --- |
| Percent C | 21.53 | 21.39 |
| Percent H | 3.29 | 2.69 |
| Percent S | 13.52 | 14.28 |

Example 2

The preparation of the 2-(sodium sulfo)ethyl ester of chloroacetic acid was repeated as follows:

To a flask equipped as described above were charged 129.9 g. (1.15 moles) of chloroacetyl chloride and 148.0 g. (1.0 mole) of sodium isethionate. The temperature of the mixture rapidly rose spontaneously to 50° C.; the temperature was maintained at 50–60° C. for an hour and 20 minutes, and then vacuum was applied for 4 hours to remove entrapped HCl. After the flask contents were removed, washed with acetone and filtered several times, and dried in vacuum at 45–48° C., 170.6 g. of the ester were obtained in the form of a pure white powder.

Example 3

A mixture of 50.0 g. (0.31 mole) of α,α-dichloropropionyl chloride and 45.9 g. (0.31 mole) of sodium isethionate was charged to a flask as above and stirred for an hour and a half at 35–40° C., after which the temperature was raised to 50° C. for 2 hours, until the material became solid. After two washings with acetone and filtrations, the reaction product was dried under vacuum. There were obtained 62.4 g. of white, solid 2-(sodium sulfo)-ethyl α,α-dichloropropionate, which analyzed as follows:

|  | Found | Calculated for $C_5H_7Cl_2NaO_5S$ |
| --- | --- | --- |
| Percent C | 20.12 | 21.99 |
| Percent Cl | 24.18 | 25.97 |
| Percent S | 12.13 | 11.74 |

Testing of the product of Example 3 was carried out as follows:

Example 4

An aluminum pan flat was filled with a mixture of ⅔ soil, screened through ¼" mesh, and ⅓ sand. Over one-third of the soil surface were scattered 20 seeds each of different kinds of grasses; seeds of broad-leaf plants were randomly scattered over the remaining surface. The seeds were then covered with soil to the pan top, and the pan was sprayed with an aqueous solution of fertilizer and an insecticide. Then the pan was sprayed with an aqueous solution containing 2-(sodium sulfo)ethyl α,α-dichloropropionate, at a rate equal to 25 lbs. per acre. Then the pan was placed in water and allowed to absorb moisture through its perforated bottom until the soil surface was completely moist; after this it was kept in a greenhouse under standard conditions of moisture and sunlight. After ten days, the number of species of plants which had germinated and grown were observed; it was found that the growth of both the broad-leaf plants and grasses in the pan had been considerably diminished or entirely suppressed. A repetition of the above experiment, in which the 2-(sodium sulfo)ethyl α,α-dichloropropionate was applied to a seeded pan at the rate of 10 lbs. per acre, gave selective repression of the growth of grasses without injury to the broad-leaf plants at this rate.

Example 5

To test the activity of the 2-(sodium sulfo)ethyl α,α-dichloropropionate as a contact herbicide, pan flats were seeded with grasses and broad-leaf plants as described above, and watered with an aqueous solution of fertilizer and insecticide, but the treatment with the sulfo ester at this point, as described in Example 4, was omitted. The pans were saturated with water and left in the greenhouse for 2 weeks; after this, the plants in the pans were sprayed with aqueous solutions of the 2-(sodium sulfo)ethyl α,α-dichloropropionate at rates of 9 and 3.6 lbs. per acre, respectively. The pans were then returned to the greenhouse and held for ten days further, after which it was found that at both the higher and the lower concentrations, the α,α-dichloropropionic acid sulfo ester had produced stunting and killing of all of the plants, both broad-leaf and grasses.

The above examples illustrate the highly potent herbicidal effects of the sulfo esters of the invention. The new esters here provided may be applied, for example, for the selective pre-emergent elimination of gramineous weeds from crops of broad-leaf plants. As contact sprays, they may be applied to eliminate vegetation from areas such as parking lots, railroad rights of way, etc. These esters have particular advantages for this application as herbicides, since in addition to their unexpectedly potent and selective effects on germinating plants, in contrast to hitherto-known alkyl esters of similar acids, the new esters provided by this invention possess high water-solubilities, for which reason they may easily be formulated for application as aqueous sprays, instead of as the emulsions required to produce aqueous dispersions of the older esters; furthermore, the new esters, unlike the known alkyl esters, have surprisingly low volatilities, so that they are not volatilized and lost from the plants or soil to which they are applied or carried as vapors to other adjacent, sensitive stands of vegetation.

In applying the sulfo esters of the invention as herbicides, the use of aqueous solutions of the esters is preferred, since such solutions may readily be prepared without special equipment. However, the employment of solid carriers, for application of the esters as herbicidal dusts, or the formulation of oil-in-water emulsions of the esters, by dissolving the esters in an oil, i. e., water-insoluble organic liquid, adding a surface-active agent, and diluting the oil solution with water, is not excluded. The rates at which the compounds of the invention may be applied to produce herbicidal effects may vary, for example, from 2 to 50 pounds per acre; larger or smaller rates of application may be employed, depending on the severity of infection of the area as well as on the particular sulfo ester used in the herbicidal composition.

What is claimed is:

1. An alkali metal salt of the 2-sulfoethyl ester of a chloroalkanoic acid, said acid containing from 2 to 4 carbon atoms, the radical attached to the carboxyl carbon atom of the said acid being a saturated aliphatic radical containing only hydrogen, from 1 to 3 carbon atoms, and from 1 to 2 chlorine atoms.

2. 2-(sodium sulfo)ethyl chloroacetate.

3. 2-(sodium sulfo)ethyl α,α-dichloropropionate.

4. A herbicidal composition comprising an inert carrier and, as the essential effective ingredient, a herbicidal amount of an alkali metal salt of the 2-sulfoethyl ester of a chloroalkanoic acid, said acid containing from 2 to 4 carbon atoms, the radical attached to the carboxyl carbon atom of the said acid being a saturated aliphatic radical containing only hydrogen, from 1 to 3 carbon atoms, and from 1 to 2 chlorine atoms.

5. A herbicidal composition comprising an inert carrier and, as the essential effective ingredient, a herbicidal amount of 2-(sodium sulfo)ethyl α,α-dichloropropionate.

6. The method of destroying undesirable plants which comprises applying to said plants a phytotoxic amount of an alkali metal salt of the 2-sulfoethyl ester of a chloroalkanoic acid, said acid containing from 2 to 4 carbon atoms, the radical attached to the carboxyl carbon atom of the said acid being a saturated aliphatic radical containing only hydrogen, from 1 to 3 carbon atoms, and from 1 to 2 chlorine atoms.

7. The method of destroying undesirable plants which comprises applying to said plants a phytotoxic amount of 2-(sodium sulfo)ethyl α,α-dichloropropionate.

8. The method of suppressing the growth of undesirable plants which comprises applying to soil containing seeds of said plants a phytotoxic amount of an alkali metal salt of the 2-sulfoethyl ester of a chloroalkanoic acid, said acid containing from 2 to 4 carbon atoms, the radical attached to the carboxyl carbon atom of the said acid being a saturated aliphatic radical containing only hydrogen, from 1 to 3 carbon atoms, and from 1 to 2 chlorine atoms.

9. The method of suppressing the growth of undesirable plants which comprises applying to soil containing seeds of said plants a phytotoxic amount of 2-(sodium sulfo)ethyl α,α-dichloropropionate.

References Cited in the file of this patent

UNITED STATES PATENTS

| | | |
|---|---|---|
| 1,881,172 | Daimler et al. | Oct. 4, 1932 |
| 2,221,275 | Taylor | Nov. 12, 1940 |
| 2,636,816 | Stewart | Apr. 28, 1953 |
| 2,642,354 | Barrons | June 16, 1953 |
| 2,649,363 | Swezey | Aug. 18, 1953 |

OTHER REFERENCES

Kohler: Am. Chem. J. 20 (1898), 683.